US009460337B2

United States Patent
Ohba et al.

(10) Patent No.: US 9,460,337 B2
(45) Date of Patent: Oct. 4, 2016

(54) INFORMATION PROCESSOR AND INFORMATION PROCESSING METHOD

(71) Applicant: SONY COMPUTER ENTERTAINMENT INC., Tokyo (JP)

(72) Inventors: Akio Ohba, Kanagawa (JP); Hiroyuki Segawa, Kanagawa (JP); Tetsugo Inada, Kanagawa (JP); Hirofumi Okamoto, Tokyo (JP)

(73) Assignees: SONY CORPORATION, Tokyo (JP); SONY INTERACTIVE ENTERTAINMENT INC., Tokyo (JP)

( * ) Notice: Subject to any disclaimer, the term of this patent is extended or adjusted under 35 U.S.C. 154(b) by 0 days.

(21) Appl. No.: 14/437,605

(22) PCT Filed: Jul. 22, 2013

(86) PCT No.: PCT/JP2013/004435
§ 371 (c)(1),
(2) Date: Apr. 22, 2015

(87) PCT Pub. No.: WO2014/083721
PCT Pub. Date: Jun. 5, 2014

(65) Prior Publication Data
US 2015/0302239 A1 Oct. 22, 2015

(30) Foreign Application Priority Data

Nov. 27, 2012 (JP) .................. 2012-259018

(51) Int. Cl.
*G06K 9/00* (2006.01)
*G06T 7/20* (2006.01)
(52) U.S. Cl.
CPC ........ *G06K 9/00261* (2013.01); *G06T 7/2033* (2013.01); *G06T 2207/10021* (2013.01); *G06T 2207/20016* (2013.01); *G06T 2207/30201* (2013.01)
(58) Field of Classification Search
None
See application file for complete search history.

(56) References Cited

U.S. PATENT DOCUMENTS 5,550,928 A * 8/1996 Lu .................. G06K 9/00221
382/103
7,263,209 B2 * 8/2007 Camus .............. G06K 9/00201
340/425.5

(Continued)

FOREIGN PATENT DOCUMENTS

| JP | 2001-143075 A | 5/2001 |
| JP | 2007-087346 A | 4/2007 |
| JP | 2009-111716 A | 5/2009 |
| JP | 2010-164440 A | 7/2010 |
| WO | 2007/050885 A2 | 5/2007 |
| WO | 2012/132168 A1 | 10/2012 |

OTHER PUBLICATIONS

Suzuki (Computer English Translation of Japanese Patent No. JP-2009-111716),2007,pp. 1-11.*

(Continued)

*Primary Examiner* — Daniel Mariam
(74) *Attorney, Agent, or Firm* — Katten Muchin Rosenman LLP

(57) ABSTRACT

An image storage section 48 stores shot image data with a plurality of resolutions transmitted from an imaging device. Depth images 152 with a plurality of resolutions are generated using stereo images with a plurality of resolution levels from the shot image data (S10). Next, template matching is performed using a reference template image 154 that represents a desired shape and size, thus extracting a candidate area for a target picture having the shape and size for each distance range associated with one of the resolutions (S12). A more detailed analysis is performed on the extracted candidate areas using the shot image stored in the image storage section 48 (S14). In some cases, a further image analysis is performed based on the analysis result using a shot image with a higher resolution level (S16a and S16b).

9 Claims, 12 Drawing Sheets

(56) References Cited

U.S. PATENT DOCUMENTS

| | | | |
|---|---|---|---|
| 8,155,397 B2* | 4/2012 | Bigioi | G06K 9/6857 |
| | | | 348/169 |
| 2004/0151376 A1* | 8/2004 | Nomura | G06K 9/00248 |
| | | | 382/181 |
| 2007/0122036 A1 | 5/2007 | Kaneda et al. | |
| 2013/0136307 A1* | 5/2013 | Yu | H04N 7/181 |
| | | | 382/103 |

OTHER PUBLICATIONS

International Search Report dated Sep. 17, 2013, from the corresponding PCT/JP2013/004435.
International Preliminary Report on Patentability and Written Opinion of the International Searching Authority dated Jun. 11, 2015 from corresponding Application No. PCT/JP2013/004435.

* cited by examiner

INFORMATION PROCESSOR AND INFORMATION PROCESSING METHOD

TECHNICAL FIELD

The present invention relates to an information processor that performs processes based on a shot image and an information processing method used by the information processor.

BACKGROUND ART

In recent years, it has become common practice that a camera is incorporated in a personal computer or game console for capturing images of a user for use in a variety of forms. For example, some technologies that are commercially available today such as TV phone and video chat are designed to transmit user's images to other end in an as-is manner via a network. Other technologies recognize user's motions by image analysis and use such motions as input information for games and information processing (refer, for example, to PTL 1). Further, it has become possible in recent years to provide a game which is better sense of realism and image representation by detecting object's motions in a three-dimensional space including the depth direction from a camera with high accuracy.

CITATION LIST

Patent Literature

[PTL 1]
WO 2007/050885 A2 Publication

SUMMARY

Technical Problems

There are a variety of problems in shooting a space in which numerous objects exist and identifying only a desired target from an image thereof or tracking its motion. For example, there is a likelihood that processing results may be affected by the change in shooting environment such as light source. The detection process of a target at higher temporal and spatial resolutions for higher accuracy leads to higher processing load. As a result, it takes time from the shooting of a subject to the output of processing result, resulting in poor response to the subject's motion.

The present invention has been devised in light of the foregoing, and it is an object of the present invention to provide a technology for processing information efficiently and with high accuracy using a shot image.

Solution to Problems

One mode of the present invention relates to an information processor. The information processor includes a candidate area extraction section, a detailed information acquisition section, and an output information generation section. The candidate area extraction section extracts a candidate area in which a target picture is likely to exist in a shot image by performing template matching on a depth image using a template image. The depth image represents, on an image plane, a distance of a subject from a camera in a depth direction as a pixel value. The template image represents a shape and a size of the target to be analyzed. The detailed information acquisition section analyzes the shot image using information relating to the candidate area extracted by the candidate area extraction section. The output information generation section generates output information based on results of image analysis performed by the detailed information acquisition section and outputs the output information.

Another mode of the present invention relates to an information processing method. The information processing method is used by an information processor to process information using an image shot with a camera. The information processing method includes a step of extracting a candidate area in which a target picture is likely to exist in a shot image by performing template matching on a depth image using a template image. The depth image represents, on an image plane, a distance of a subject from a camera in a depth direction as a pixel value. The template image is read from a memory and represents a shape and a size of the target to be analyzed. The information processing method further includes a step of analyzing the shot image using information relating to the extracted candidate area. The information processing method still further includes a step of generating an output image reflecting image analysis results and outputting the output image to a display device.

It should be noted that any combinations of the above components and any conversions of expressions of the present invention between "method," "device," "system," "computer program," "recording medium storing a computer program," and so on are also effective as modes of the present invention.

Advantageous Effect of Invention

The present invention achieves excellent response in information processing using a shot image as input information.

DESCRIPTION OF EMBODIMENT

Figure 1:
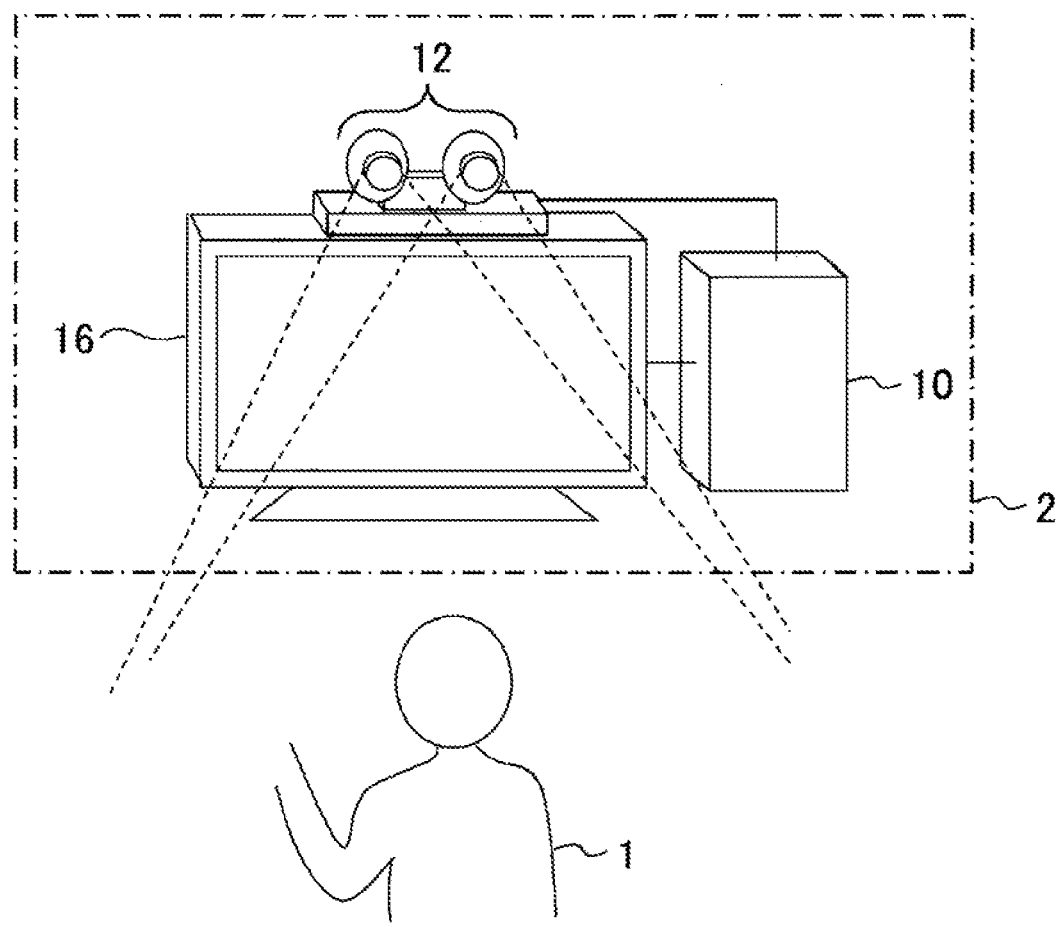
FIG. 1 is a diagram illustrating a configuration example of an information processing system to which the present embodiment is applicable.

FIG. 1 illustrates a configuration example of an information processing system to which the present embodiment is applicable. An information processing system 2 includes an imaging device 12, an information processor 10, and a display device 16. The imaging device 12 includes two cameras adapted to capture a subject such as a user 1. The information processor 10 handles information processing in response to a request of the user based on the shot image. The display device 16 outputs image data obtained as a result of the processes performed by the information processor 10. The information processor 10 may connect to a network such as the Internet.

The information processor 10, the imaging device 12, and the display device 16 may be connected together by cables. Alternatively, they may be connected together wirelessly, for example, through wireless LAN (Local Area Network). Any two of the imaging device 12, the information processor 10, and the display device 16, or all thereof may be combined integrally. Alternatively, the imaging device 12 need not necessarily be disposed on top of the display device 16. Further, there are no limitations to the number and types of subjects.

The imaging device 12 has two digital video cameras that are arranged, one on the left and another on the right with a known space therebetween. Each of the digital video cameras includes a CCD (Charge Coupled Device), CMOS (Complementary Metal Oxide Semiconductor), or other imaging element. Each of the digital video cameras captures a subject existing in the same space from the right or left position at a given frame rate. A frame pair obtained by shooting as described above will be hereinafter referred to as "stereo images."

The information processor 10 identifies the image of a subject such as the user 1 by analyzing, for example, a stereo image shot with the imaging device 12, thus processing information based on the identified picture. For example, the information processor 10 identifies the head position of the user 1 and performs a face recognition process on the head region, thus recognizing a human or identifying his or her facial expression. Alternatively, the information processor 10 may perform tracking based on the detected position of the head or other area, thus recognizing a gesture, reflecting the position into the game image, converting the position into a command input for performing information processing appropriate to the command, and so on. Thus, the application purpose of information obtained by analyzing an image in the present embodiment is not specifically limited.

At this time, the information processor 10 first extracts a candidate area in which the target picture is likely to exist in a shot image based on the shape and size of a target prepared in advance. Then, the information processor 10 further subjects the extracted area to image analysis in a more detailed manner. As described above, the information processor 10 proceeds with analysis in a step-by-step manner. That is, the information processor 10 extracts an area in which a target picture is likely to exist by macroscopically analyzing an image first, followed by microscopic analysis of the extracted area, thus providing improved processing efficiency as a whole. Moreover, the information processor 10 adjusts, in each step, the level of detail of processing depending on the distance of the target from the imaging device 12, thus contributing to information processing with robustness to the target position.

The display device 16 displays the result of the process performed by the information processor 10 as an image as necessary. The display device 16 may be a display adapted to output an image or a television set having a speaker adapted to output sounds. The display device 16 may be, for example, a liquid crystal television, plasma television, PC display, and so on.

Figure 2:
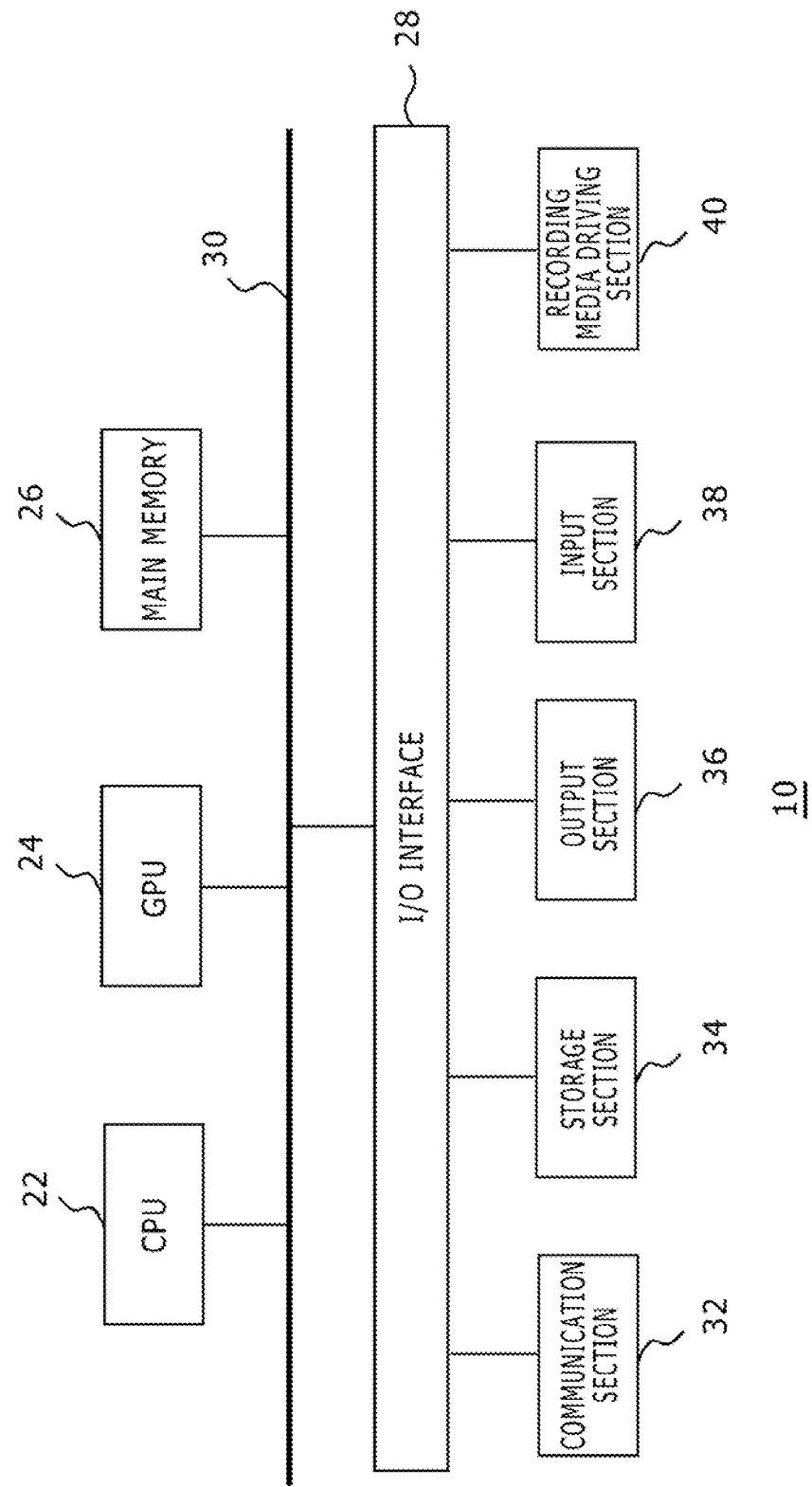
FIG. 2 is a diagram illustrating an internal circuit configuration of an information processor according to the present embodiment.

FIG. 2 illustrates an internal circuit configuration of the information processor 10. The information processor 10 includes a CPU (Central Processing Unit) 22, a GPU (Graphics Processing Unit) 24, and a main memory 26. The CPU 22 performs processes associated with the internal components of the information processor 10 and controls the exchange of signals based on programs such as the operating system and application programs. The GPU 24 handles image processing. The main memory 26 includes a RAM (Random Access Memory) and stores programs and data required for processing.

These sections are connected to each other via a bus 30. An I/O interface 28 is also connected to the bus 30. A communication section 32, a storage section 34, an output section 36, an input section 38, and a recording media driving section 40 are connected to the I/O interface 28. The communication section 32 includes a peripheral interface such as USB and IEEE1394 and wired or wireless LAN network interface. The storage section 34 includes a hard disk drive, a nonvolatile memory, and so on. The output section 36 outputs data to output devices such as the display device 16 and the speaker. The input section 38 receives data inputs from input devices such as keyboard, mouse, the imaging device 12, and microphone. The recording media driving section 40 drives removable recording media such as magnetic disk, optical disc, or semiconductor memory.

The CPU 22 controls the whole of the information processor 10 by executing the operating system stored in the storage section 34. The CPU 22 also executes various programs that are either read from the removable recording media and loaded into the main memory 26 or downloaded via the communication section 32.

The GPU 24 has a geometry engine function and a rendering processor function, performing drawing in accordance with a drawing instruction from the CPU 22, and storing a display image in a frame buffer which is not shown. Then, the display image stored in the frame buffer is converted into a video signal and output, for example, to the output section 36.

Figure 3:
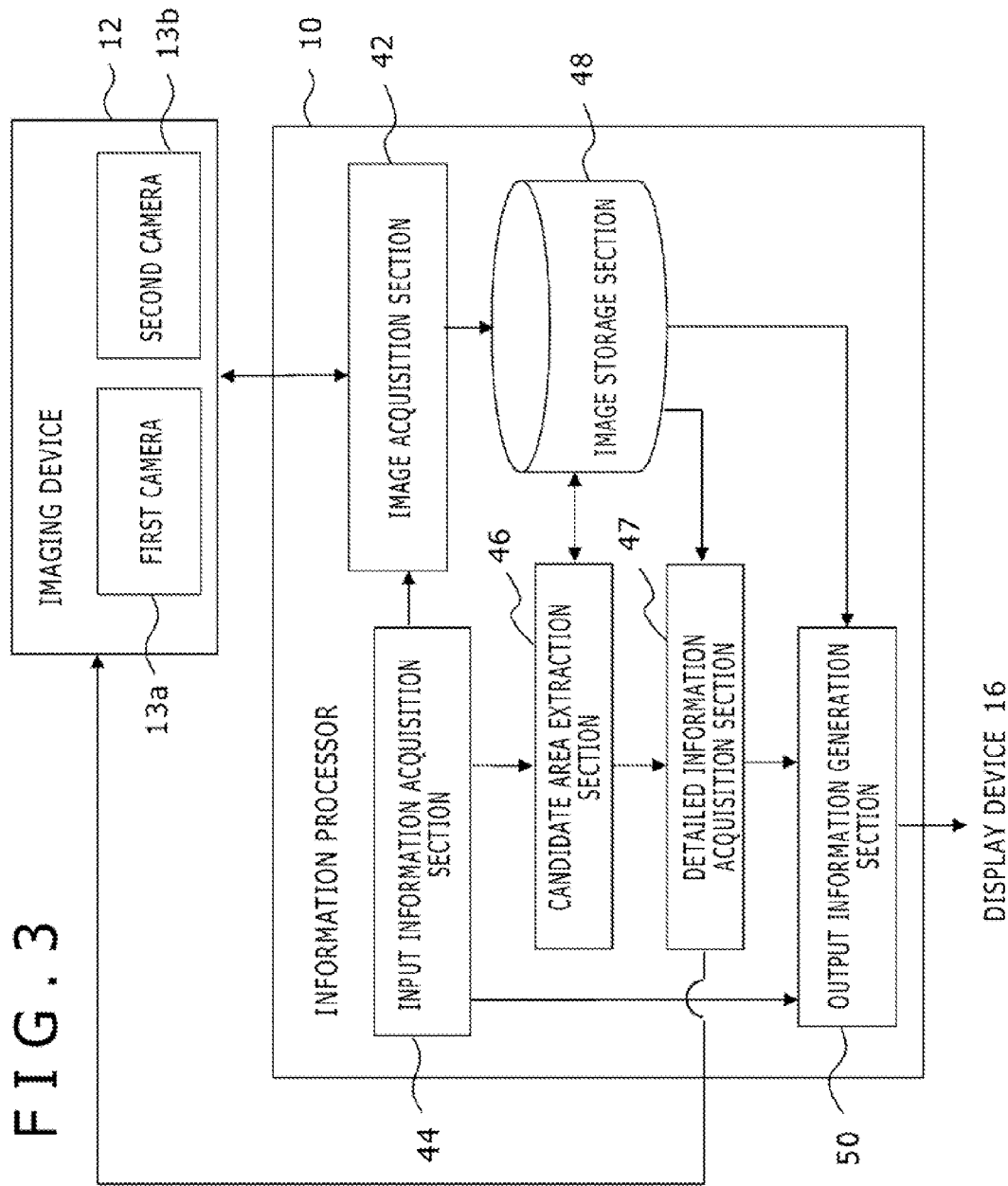
FIG. 3 is a diagram illustrating configurations of an imaging device and the information processor in detail according to the present embodiment.

FIG. 3 illustrates configurations of the imaging device 12 and the information processor 10 in detail. Each of the functional blocks illustrated in FIG. 3 can be implemented in terms of hardware by the CPU, the GPU, the RAM illustrated in FIG. 2, and other processors and in terms of software by programs offering data input, data retention, image analysis, drawing and other functions. Therefore, it will be understood by those skilled in the art that these functional blocks can be implemented in various forms including hardware alone, software alone, and a combination thereof, and are not limited to any one of them.

The imaging device 12 includes first and second cameras 13a and 13b. Each of the cameras captures a subject from the left or right position at a given frame rate. The left and right positions are spaced by a known width. The stereo images obtained by shooting are transmitted to the information processor 10 whenever necessary by an ordinary technique in response to a request from the information processor 10.

The information processor 10 includes an image acquisition section 42, an input information acquisition section 44, a candidate area extraction section 46, a detailed information acquisition section 47, an output information generation section 50, and an image storage section 48. The image acquisition section 42 acquires stereo images from the imaging device 12. The input information acquisition section 44 acquires an instruction input from the user. The candidate area extraction section 46 extracts a candidate area in which a target picture is likely to exist by using a depth image. The detailed information acquisition section 47 performs more detailed analysis on the candidate area by using a shot image, thus acquiring given information. The output information generation section 50 generates output information based on the detailed analysis result. The image storage section 48 stores stereo images supplied from the imaging device 12 and data such as a depth image generated, for example, by the candidate area extraction section 46.

The input information acquisition section 44 accepts an instruction input to start instruction or terminate instruction the process and an instruction input from the user by the means except of the imaging device 12 and transmits an appropriate processing request signal to other functional blocks. The input information acquisition section 44 is implemented by coordination between an ordinary input device such as button, keyboard, mouse, trackball, or touch panel and the CPU adapted to interpret the details of operation performed on the input device and generate a processing request signal.

The image acquisition section 42 sequentially acquires data of images shot with the imaging device 12 in response to a request from the input information acquisition section 44, storing the data in the image storage section 48. Acquired image data is not limited to data of a stereo image which is a pair of images and may be determined as appropriate in accordance with the nature of processing tasks handled by the candidate area extraction section 46, the detailed information acquisition section 47, and the output information generation section 50. Further, image data may be acquired at various frequencies. For example, only the images shot with the first camera 13a may be acquired at the shooting frame rate, and stereo images shot with the first and second cameras 13a and 13b may be acquired at a lower frame rate, i.e., less frequently. Thus, the rate at which an image shot with the first camera 13a is acquired and the rate at which an image shot with the second camera 13b is acquired may be specified independently of each other.

Further, the imaging device 12 may generate images with a plurality of resolutions by reducing a movie shot with at least either the first camera 13a or the second camera 13b in a plurality of steps on a frame-by-frame basis. In this case, the image acquisition section 42 requests, to the imaging device 12, data of one of the images with the plurality of resolutions generated by the imaging device 12 that is necessary for processing or data of all the images. Then, the image acquisition section 42 stores the image data acquired at each time in the image storage section 48 one after another. An image shot with or generated by the imaging device 12 will be hereinafter also referred to as a "shot image" irrespective of whether or not it is a stereo image.

The candidate area extraction section 46 generates depth images using data of the stereo image stored in the image storage section 48 and performs template matching using a template image representing the shape and size of a given target, thus extracting a candidate area in which the target picture is likely to exist. A depth image represents a position distribution of subjects existing in the field of view of the imaging device 12 in the depth direction, showing the distance of each subject from the imaging device 12 that is mapped into two-dimensional coordinates of the image plane and represented as a pixel value.

The distance of a subject in the depth direction can be found by an ordinary technology such as the stereo image method. Here, the stereo image method is an ordinary technique which detects matching points between stereo images to calculate the distance of the subject in the depth direction from the parallax thereof. As a result, the depth image represents the positions of not only main subjects such as persons but also a variety of objects existing in the space to be shot such as chair and desk together with their shapes. It should be noted that the imaging device 12 may incorporate only one camera for shooting images and another for irradiating a reference beam. The reference beam irradiating camera obtains the positions of subjects in a three-dimensional space by analyzing the reflection time of the reference beam such as infrared ray irradiated onto the subjects. At this time, the image acquisition section 42 acquires ordinary shot image data and subject position information. The candidate area extraction section 46 generates depth images based on the latter. Depth image data itself may be acquired from the camera.

The candidate area extraction section 46 extracts a candidate area in which a target picture having a given shape and size is likely to exist by performing template matching on the depth image. Therefore, reference template image data for matching representing the shape and the size is prepared in advance. The size of the reference template image is adjusted in accordance with the position of each of the pictures in the depth direction represented by the depth image, followed by matching. The reference template image data is stored, for example, in a memory accessible by the candidate area extraction section 46.

If it is sufficient to detect the position of one kind of target such as head, only one reference template image may be prepared. Alternatively, a plurality of reference template images for a plurality of kinds of targets or a plurality of sizes may be prepared so as to switch between the targets or sizes in accordance with the process performed at a later stage or in response to a user request. For example, a target or size may be specified within the program executed by the information processor 10. Alternatively, a target or size may be selected by the user in accordance with the desired process.

Then, the size of the reference template image is adjusted in accordance with the position of each of the subjects in the depth direction first, followed by matching against the subject, thus calculating a matching evaluation value that represents the degree of match. A candidate area for a desired target is extracted by acquiring the position and size of the template image when a high matching evaluation value is obtained. This ensures that a subject having the same shape but not the same size is not extracted, thus restricting the shape and size and allowing to extract a candidate area.

The candidate area extraction section 46 may generate depth images with a plurality of resolutions by using stereo images with a plurality of resolutions stored in the image storage section 48. Then, the candidate area extraction section 46 may switch between resolutions for the depth image to be matched in accordance with the distance range of the subject in the depth direction. More specifically, a low-resolution depth image is used for template matching on a subject close from the imaging device 12, and a high-resolution depth image is used for template matching on a subject far from the imaging device 12. This ensures consistency in size of information held by the picture irrespective of the distance of the subject. Moreover, the extent to which the reference template is adjusted in size is restricted. As a result, the accuracy with which candidate areas are extracted is uniform irrespective of the distance. Moreover, this eliminates the need for excessive processing such as uselessly detailed analysis, thus making it possible to control processing load.

The detailed information acquisition section 47 performs detailed image analysis on the candidate area extracted by the candidate area extraction section 46 in a manner tailored to the eventual purpose of information processing. For example, a face detection process is performed on a candidate area that is likely to be a human head, thus determining whether or not the area in question is a head. A face recognition process is performed further on an area in which a face has been detected to identify the person. Alternatively, tracking may be performed by estimating the position and shape of the target at the next time step based on the candidate area at each time. In any case, restricting the candidate area extracted in the previous stage to a given range keeps processing load and the required amount of time to a minimum even if image analysis is performed with high resolution.

The output information generation section 50 performs a process tailored to the application purpose, further performs rendering process to the shooting images read from the image storage section 48 for example, based on results of processing performed by the detailed information acquisition section 47. Here, the process is not specifically limited and may be changed in accordance with the user instruction received by the input information acquisition section 44 or the program to be executed. Image data obtained as a result of processing is output and displayed on the display device 16. Alternatively, image data may be transmitted to other device via a network.

Figure 4:
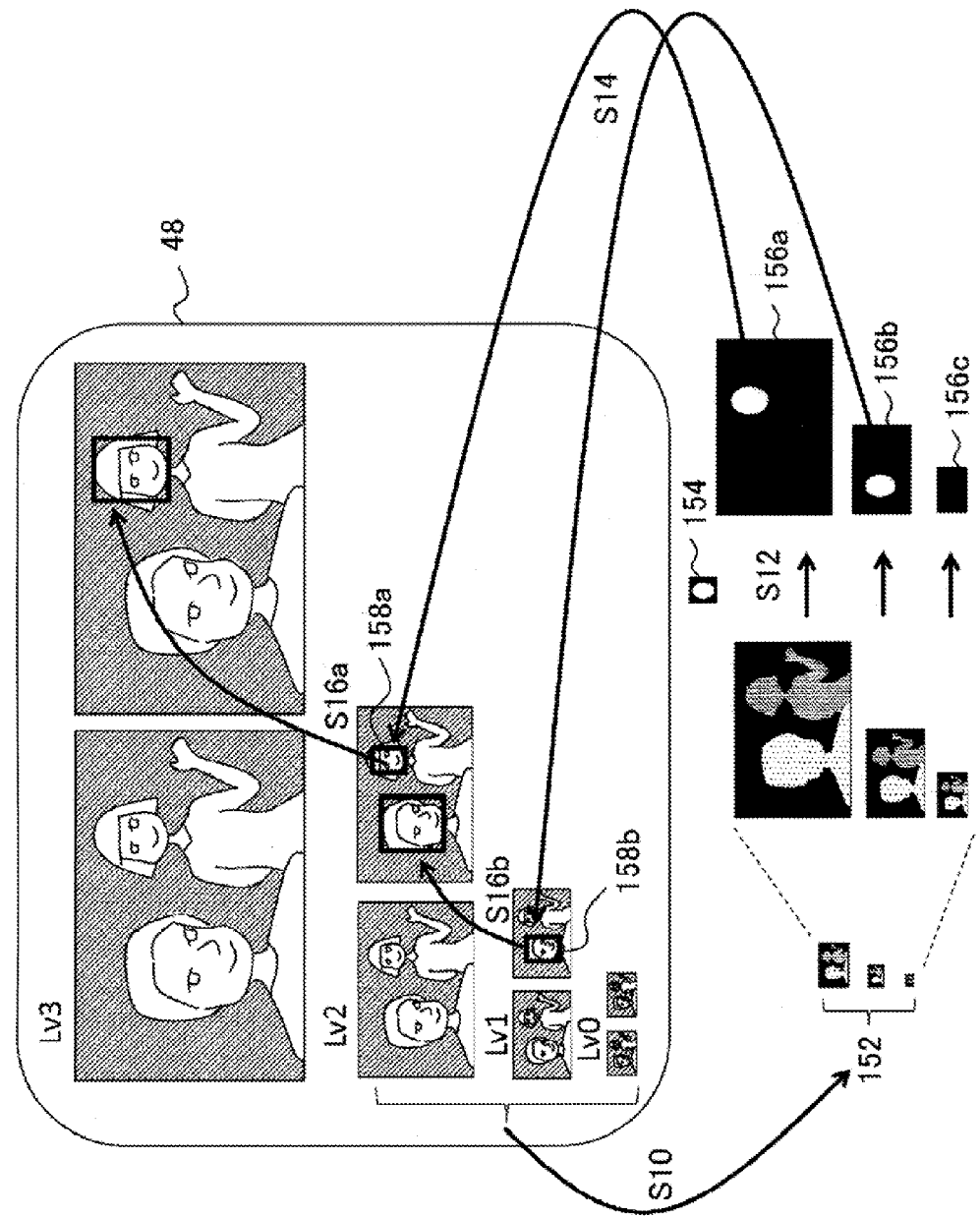
FIG. 4 is a diagram schematically illustrating the relationship between the steps handled by the information processor and images according to the present embodiment.

FIG. 4 is a diagram schematically illustrating the relationship between the steps handled by the information processor 10 and images. First, the image storage section 48 stores shot image data transmitted from the imaging device 12. Here, stereo image data with a plurality of resolutions, i.e., four resolution levels which are, in ascending order of resolution, "Lv0" (level 0), "Lv1" (level 1), "Lv2" (level 2), and "Lv3" (level 3), is stored as described above. However, the main point is not to limit the image stored in the image storage section 48 thereto. Moreover, all the images may be not represented in the same color space. Low-resolution images that are not used for display may have only a luminance value. In this case, conversion between color spaces may be handled by the information processor 10 itself.

Resolution levels of image data are, for example, HD (1280×800 pixels), VGA (640×400 pixels), QVGA (320×200 pixels), and QQVGA (160×100 pixels). The candidate area extraction section 46 generates depth images 152 first using such stereo images (S10). At this time, the candidate area extraction section 46 generates the depth images 152 with a plurality of resolutions using stereo images with a plurality of resolution levels.

For example, stereo matching is performed using one of the three pairs of stereo images whose resolution levels is one of "Lv0" to "Lv2" for each matching run, thus generating the depth images 152 with three resolutions. The resolutions of the depth images 152 generated at this time may be smaller than that of the original stereo images. For example, the positions of a subject in the depth direction are acquired in units of 4×4 pixels of the original stereo image. In this case, the depth images 152 are both vertically and horizontally ¼ the size of the original stereo images with the resolution levels "Lv0," "Lv1," and "Lv2," respectively, as illustrated in FIG. 4. It should be noted that the depth images 152 are enlarged and shown to the right for ease of understanding in FIG. 4.

The larger the pixel value of the depth image 152, the smaller the distance thereof in the depth direction, that is, the closer to the cameras. However, the main point is not to limit the data format of the depth image thereto. When the depth image 152 is displayed as an image, the closer a subject is from the cameras, the more luminous it becomes. In FIG. 4, the difference in image display luminance is represented by ensuring that the larger the pixel value, the smaller the density of shading.

Each of these depth images 152 is subjected to template matching using a reference template image 154 that represents the desired shape and size, thus extracting a candidate area for a target having the shape and size (S12). In each of the depth images 152, the pixel value is the position of each subject in the depth direction. Therefore, the reference template image 154 is adjusted in size based on the image size assuming that the target exists at the position corresponding to the pixel value, after which the reference template image 154 is compared against the picture of each subject. This makes it possible to extract a candidate area for the picture that is likely to be the desired target in such a manner that not only the shape but also the size are restricted.

At this time, the resolution of the depth image to be matched is switched from one to another in accordance with the range of distance of the subject in the depth direction. For example, if the depth images 152 with three resolutions are generated as illustrated in FIG. 4, a distance range is divided into three, with the short distance being associated with the depth image with the lowest resolution, the medium distance with the depth image with the medium resolution, and the long distance with the depth image with the highest resolution. Then, each depth image is subjected to template matching. At this time, template matching is performed only on the subject picture existing in the associated distance range. This ensures that the subject pictures are comparable to each other in size during matching irrespective of the position. As a result, subject picture areas can be extracted with similar accuracy irrespective of the subject positions.

In the example shown in FIG. 4, an elliptical image representing a head is available as the reference template image 154. As a result, an area that is likely to be a picture of the subject's head is determined for each distance range. This example shows that a white area in an image 156b has been extracted for the medium distance and a white area in an image 156a has been extracted for the long distance as candidate areas for head pictures. Further, this example shows that the subject in the short distance has no area that is likely to be a head picture because there is no white area in a low-resolution image 156c.

The detailed information acquisition section 47 performs further detailed analysis on the candidate areas obtained as described above using the shot image stored in the image storage section 48 (S14). For this reason, the detailed information acquisition section 47 associates the resolutions of the depth images used by the candidate area extraction section 46 and the resolution levels to be analyzed by the detailed information acquisition section 47 in advance. For example, the original shot images with the resolution levels "Lv0" to "Lv2" that have been used to generate the depth images are each associated with one of the candidate areas. However, the main point is not to limit the association therebetween.

In this case, image analysis such as face detection process is performed on an area 158*b* of the image with resolution level Lv1 that is associated with the candidate area (white area of the image 156*b*) extracted in the medium distance as illustrated in FIG. 4. Similarly, face detection or other process is performed on an area 158*a* of the image with resolution level Lv2 that is associated with the candidate area (white area of the image 156*a*) extracted in the long distance. Here, the areas 158*a* and 158*b* to be analyzed are rectangular areas of given sizes that include the areas extracted by the candidate area extraction section 46.

The detailed information acquisition section 47 may further perform other analysis using the results of image analysis such as face detection process. For example, a face recognition process may be performed using only the area of the candidate area in which a face has been detected. At this time, the resolution level may be further switched from one to another as necessary. For example, using an image even higher in resolution than that subjected to face detection provides improved accuracy in face recognition (S16*a* and S16*b*).

As described above, two processes, one for extracting candidate areas in which targets are likely to exist without fail and another for analyzing the extracted areas in a detailed manner, are separated from each other and proceeded step by step, thus making it possible to switch between images to be processed or details of the processes in accordance with the accuracy required of each of the processes. Further, the image to be processed is switched from one to another in accordance with the subject position in each process. This provides highly accurate processing results with high efficiency.

Figure 5:
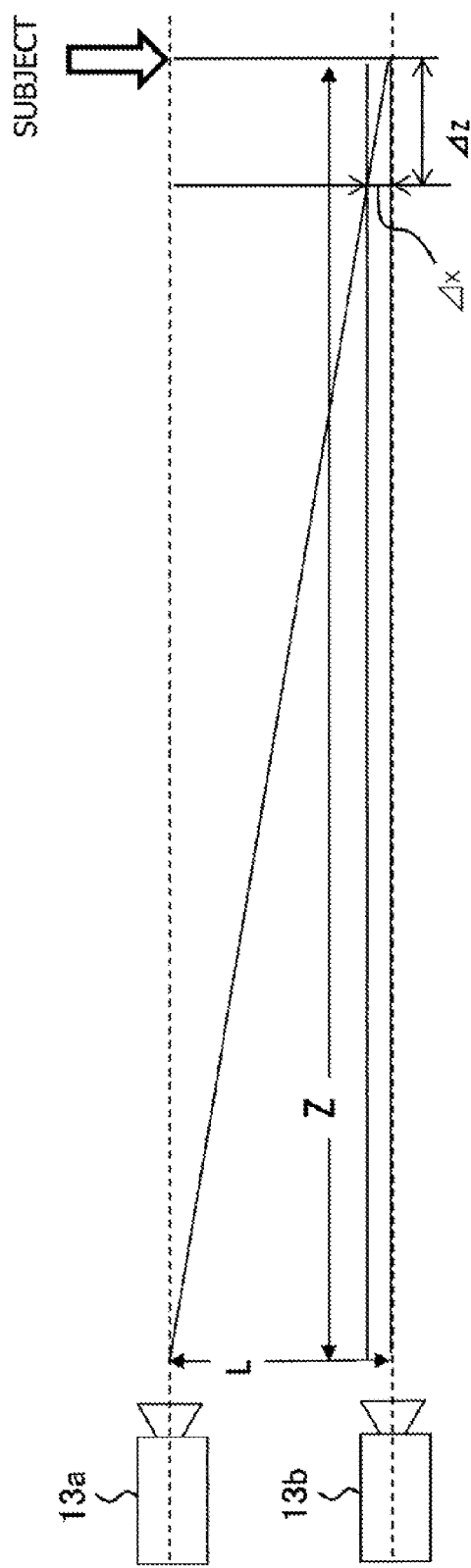
FIG. 5 is a diagram for describing the relationship between stereo image parallax and the position of a subject in the depth direction according to the present embodiment.

A description will be given next of the relationship between the subject position in the depth direction and the template image size during matching by the candidate area extraction section 46. We assume here that the same unit of length such as meters is used unless otherwise specified. FIG. 5 is a diagram for describing the relationship between stereo image parallax and the position of a subject in the depth direction. The first and second cameras 13*a* and 13*b* are disposed in such a manner as to have parallel optical axes that are at a distance L from each other. We assume that the subject is located at the position indicated by the arrow at the far right end. This position is at a distance Z in the depth direction.

A width Δx in the real space represented by a pixel of the image shot by each of the cameras is proportional to the distance Z and expressed as follows:

$$\Delta x = Z \times w/W \quad (1)$$

where W is the horizontal pixel count of the camera, w is the horizontal range of view field of the real space when the distance Z is 1 and is determined by the view angle.

The same subject captured by the cameras that are at the distance L from each other has approximately the following parallax D in pixels (pixels) in that image:

$$D = L/\Delta x = L \times (W/w) \times (1/Z) = C/Z \quad (2)$$

where C is the value determined by the camera and its setting and can be considered a constant during operation. Assuming that parallax $D_{at1}$ (pixels) at the distance Z of 1 is known, the distance Z in the depth direction for the arbitrary parallax D (pixels) is found as follows:

$$Z = D_{at1}/D \quad (3)$$

On the other hand, assuming that the reference template image used by the candidate area extraction section 46 represents the target in a width $p_{tmp}$ (pixels) in pixels, a width p (pixels) of the target in pixels at the arbitrary distance Z is inversely proportional to the distance Z in the depth direction as is the parallax D (pixels) and expressed as follows:

$$p = p_{tmp} \times (Z_{tmp}/Z) \quad (4)$$

where $Z_{tmp}$ is the distance of a target in the depth direction when the target is represented in the size matching the reference template in the shot image.

Letting the width represented by one pixel of the reference template in the real space be denoted by $\Delta x_{tmp}$ and letting the width represented by one pixel of the image shot with a camera in the real space at the distance Z of 1 be denoted by $\Delta x_{at1}$, then the following holds from formula (1):

$$\Delta x_{tmp} = Z_{tmp} \times w/W \quad (5)$$

$$\Delta x_{at1} = w/W \quad (6)$$

Hence, the following formula is obtained:

$$Z_{tmp} = \Delta x_{tmp}/\Delta x_{at1} \quad (7)$$

Therefore, formula (4) changes to the following:

$$p = p_{tmp} \times \Delta x_{tmp}/\Delta x_{at1}/Z \quad (8)$$

As a result, a magnification factor M by which the reference template image is to be multiplied to fit the reference template image to the size of the subject in the image at the arbitrary distance Z is found as follows:

$$M = \Delta x_{tmp}/\Delta x_{at1}/Z \quad (9)$$

$\Delta x_{at1}$ is a fixed value which depends, for example, on the camera. Therefore, the size can be adjusted by determining $\Delta x_{tmp}$ in accordance with the reference template image to be prepared. For example, if the position of a human head is identified, and if a reference template image is prepared which assumes the head to be 0.2 m wide or so and represents the actual width of 0.3 m including a margin area as 16 pixels in width, $\Delta x_{tmp} = 0.3/16 = 0.019$ m. It should be noted that, in the present embodiment, matching is performed between a depth image and a size-adjusted template image as described above. Therefore, if the shooting image and the depth image differ in resolution, the width of the real space represented by one pixel of the depth image is assumed to be $\Delta x_{at1}$.

Figure 6:
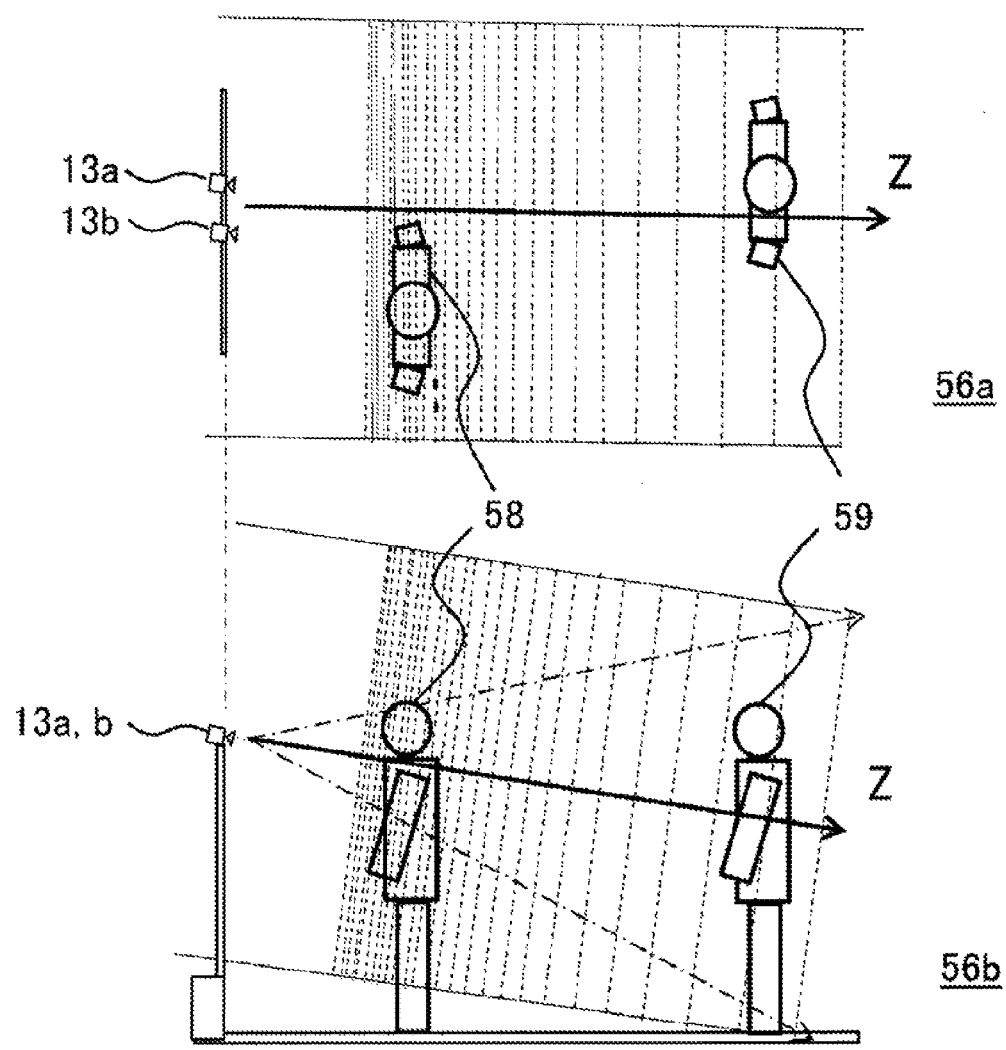
FIG. 6 is a diagram for describing axes in the depth direction in a shooting space in the present embodiment.

FIG. 6 is a diagram for describing axes in the depth direction in a shooting space. The figure at the top is a schematic diagram 56*a* as seen from top of the shooting space. The figure at the bottom is a schematic diagram 56*b* as seen from side of the shooting space. Persons 58 and 59, subjects, are in the fields of view of the first and second cameras 13*a* and 13*b*.

It should be noted that the optical axes of the first and second cameras 13*a* and 13*b* are parallel with no vertical displacement between them as shown in FIG. 5. There is actually vertical displacement between them in some cases. However, we assume that an image shot in such an environment is corrected to a condition free from displacement by an ordinary technique. In FIG. 6, dotted lines represent equal parallax planes. Here, the term "equal parallax plane" refers to a plane on which the parallax is the same on all points of the plane, and by extension, to a plane on which the distance Z from the cameras is equally calculated by formula (2). Therefore, the distance Z in the depth direction is defined by the distance from the imaging planes (sensor planes) of the cameras on the axis (optical axes) vertical to the equal parallax planes as shown in FIG. 6.

Figure 7:
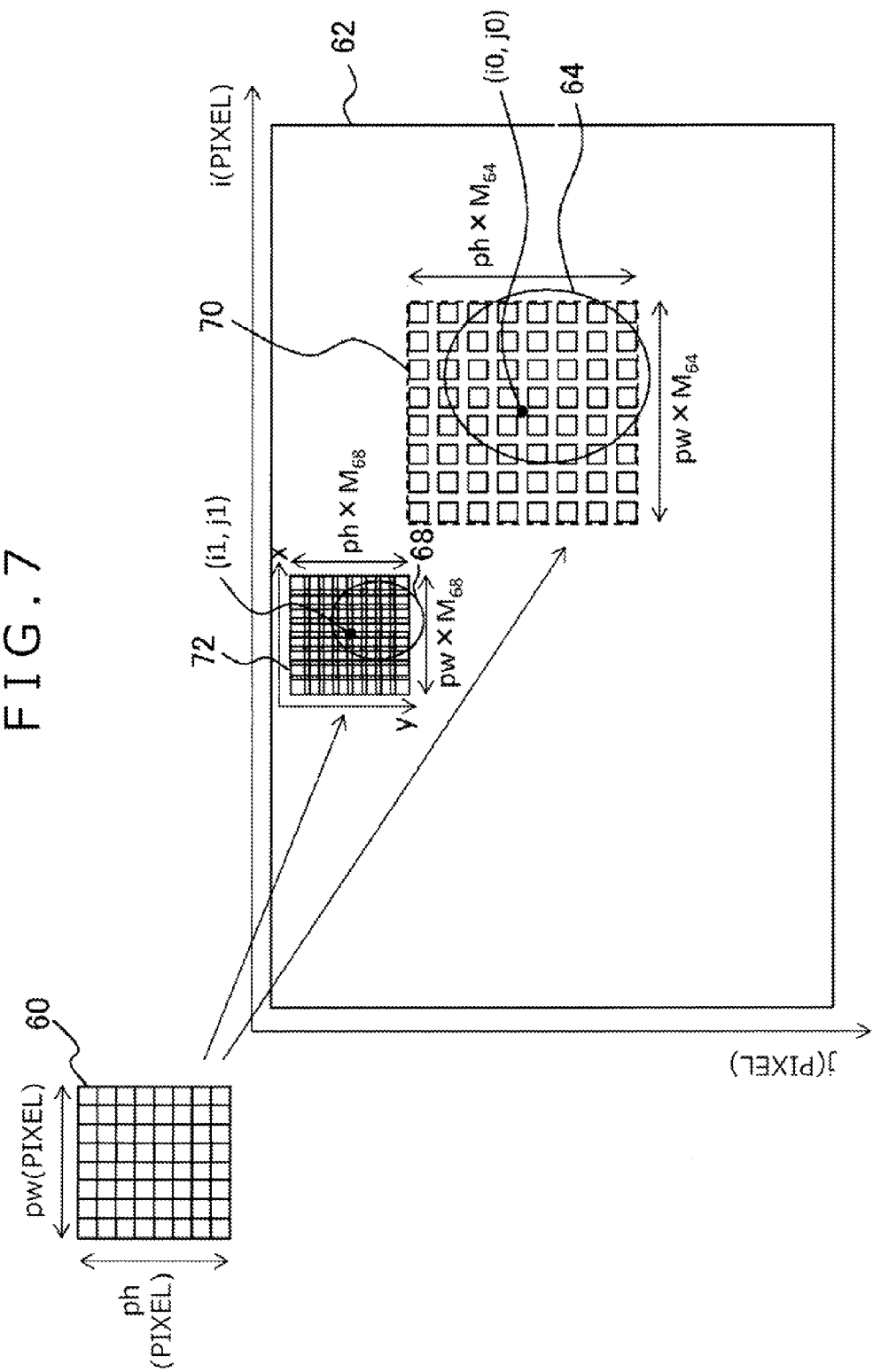
FIG. 7 is a diagram for describing a specific technique for adjusting the size of a reference template image first and then calculating a matching evaluation value according to the present embodiment.

FIG. 7 is a diagram for describing a specific technique for adjusting the size of a reference template image first and then calculating a matching evaluation value. A reference template image 60 in FIG. 7 is divided into cells of a lattice, with each cell representing one pixel. As for the depth image 62, on the other hand, only the contours of the heads of the subjects 64 and 68 are shown by solid lines for ease of comprehension. It should be noted that the data format of the pixel value of the depth image is not limited so long as the pixel value uniquely determines the distance of a subject in the depth direction as described above. However, we assume that the pixel value is converted into a distance as appropriate in the description given below.

A horizontal pixel count pw (pixels) and a vertical pixel count ph (pixels) of the reference template image 60 are both 8 or pw=ph=8 in FIG. 7. However, the main point is not to limit the pixel counts thereto. The candidate area extraction section 46 scans the pixels of the depth image 62 first, for example, in raster order, thus detecting the pixels whose values fall within a given range. Here, the term "given range" refers to a pixel value range associated with a subject distance range that is in turn associated with one of the depth images.

In FIG. 7, one of the pixels detected as described above is represented by pixel coordinates (i1, j1). This pixel is included in the picture area of the subject 68. When such a pixel is detected, a template image 72 is arranged so that that pixel is located at the center of the template image 72. It should be noted, however, that the reference template image 60 is reduced by the magnification factor $M_{68}$ ($M_{68}<1$) appropriate to the pixel value of this pixel, and by extension, a distance $Z_{68}$ in the depth direction. Therefore, the horizontal width of the template image 72 to be arranged is pw×$M_{68}$ (pixels) in pixels, and the vertical width thereof is ph×$M_{68}$ (pixels) in pixels.

As described above, a reference template image represents the shape of a target when the target is located at the preset distance $Z_{tmp}$ in the depth direction. Therefore, if the distance Z represented by the detected pixel is greater, i.e., farther, than the distance $Z_{tmp}$, the magnification factor M is less than 1 from formulas (7) and (9). As a result, the reference template image is reduced. Conversely, if the distance Z represented by the pixel is smaller, i.e., closer, than the distance $Z_{tmp}$, the magnification factor M is greater than 1. As a result, the reference template image is enlarged. It should be noted that the reference distance $Z_{tmp}$ may be common to all the reference template images prepared. Alternatively, the reference distance $Z_{tmp}$ may be different from one reference template image to another.

Then, the pixel value of the template image 72 and the pixel value of the depth image 62 are compared at the same position. As illustrated in FIG. 7, the reference template image 60 is reduced relative to the subject 68. As a result, the gap between pixels in the template image 72 becomes smaller than the gap between pixels in the depth image 62. That is, the pixels to be compared may not be in a one-to-one correspondence. In this case, the pixel of the depth image 62 close to the pixel of the template image 72 is basically considered to be "at the same position." As a result, a plurality of pixels of the template image 72 may be compared with one pixel of the depth image 62.

Assuming that the coordinates of each of the pixels of the template image 72 are (x, y), coordinates (i, j) of the pixel of the depth image 62 considered to be "at the same position" can be found, for example, as follows:

$$i=i1+(x-pw/2)\times M1 \qquad (10)$$

$$j=j1+(y-ph/2)\times M1 \qquad (11)$$

Here, the second term of the right side is changed to an integer by rounding off or dropping the fractional part.

The same is true for matching against the subject 64. That is, if coordinates (i0, j0) of one of the pixels detected by scanning falls within the picture area of the subject 64, the pixel value of this pixel is a distance $Z_{64}$ of the subject 64 in the depth direction. Therefore, a magnification factor $M_{64}$ ($M_{64}>1$) is calculated in accordance therewith. Then, a template image 70, obtained by enlarging the reference template image 60 by the magnification factor $M_{64}$, is arranged so that the pixel is located at the center of the template image 70. Here, the horizontal width of the template image 70 is pw×$M_{64}$ (pixels), and the vertical width thereof is ph×$M_{64}$ (pixels).

Then, the pixel value of the template image 70 and that of the depth image 62 are compared at the same position. In this case, the reference template image 60 has been enlarged. Therefore, the gap between pixels in the template image 70 is larger than that in the depth image 62. However, the pixel of the depth image 62 considered to be at the same position as each of the pixels of the template image 70 can be determined as with formulas (10) and (11).

When the pixel of the template image is associated with that of the depth image as described above, a matching evaluation value is calculated using the pixel values of the two pixels. A matching evaluation value can be calculated by using a calculation technique used for an ordinary matching process. In the present embodiment, however, a matching evaluation value is calculated as follows. First, when the pixel value of the depth image associated with each pixel of the template image, i.e., the distance Z in the depth direction, is obtained, it is determined whether or not the pixel value falls within a given range from $Z_{68}$ or $Z_{64}$, the pixel value at the coordinates (i1, j1) or (i0, j0) in the example shown in FIG. 7, which was the reason why the template image was arranged.

When the pixel value falls within the given range, it is possible to assume that the same subject as that detected at the coordinates (i1, j1) or (i0, j0) of the depth image is continuous to the pixel in question. For example, in order to detect the head position, a target can be determined to be part of the continuous surface of the head so long as it falls within the range of about 10 to 30 cm at the front and back. A specific range is determined according to the actual shape of the target.

Then, a matching evaluation value V is calculated as follows:

$$V=\Sigma u_n \times B_n \qquad (12)$$

where Σ is the sum of all the pixels of the template image, and $u_n$ takes on the value of "+1" if the pixel value of the depth image associated with the nth pixel of the template image falls within the above setting range, and, if not, takes on the value of "−1," and $B_n$ is the pixel value of the nth pixel in the template image, and takes on the value of "1" if the pixel is located inside the shape of the target, and if not, takes on the value of "0."

Such a calculation technique ensures that if the distance of an object in the depth direction falls within the given range, and by extension, if the object is integral, and the closer the object is in shape and size to the template image, the higher the evaluation value V at the template image position. This calculation technique is merely an example, and it will be understood by those skilled in the art that the technique can be applied in various ways in accordance with, for example, the data format of each image.

The candidate area extraction section 46 generates a matching evaluation value distribution having a matching evaluation value associated with each of the pixels in the depth image. Then, the candidate area extraction section 46 determines, as output values, a point whose matching evaluation value is maximal above a given threshold and the size of the template image at that time. If such a process is performed on the depth images with a plurality of resolutions, it is possible to output, to the detailed information acquisition section 47, an area in which a target picture such as head is likely to exist for each resolution level associated with the distance range of the subject in the depth direction as shown in FIG. 4.

It should be noted that the candidate area extraction section 46 may determine a candidate area for the reference body region of the subject once, for example a head, and further extract a candidate area for other region. For example, the positions of the hand, feet, and torso relative to the head are limited. Thanks to the depth images used in the present embodiment, the positions of the extracted pictures in the depth direction are known. By taking advantage of this, it is possible to restrict the ranges of motion of other body regions in a three-dimensional space. Then, candidate areas for the plurality of body regions can be extracted efficiently and with high accuracy by repeating template matching only on each of the restricted areas after changing the reference template to the one prepared for that body region.

Alternatively, similar pattern matching may be performed in parallel with reference template images of a plurality of body regions by implementing the candidate area extraction section 46 with the GPU 24 for pattern matching. Such parallel processing can be achieved at high speed by using the multiple render target system or the color plane system incorporated in the GPU. All the candidate areas for the pictures of different body regions may be speculatively extracted first through parallel processing, thus supplying, to the detailed information acquisition section 47, only candidate areas considered highly reliable based on their relative positions.

A description will be given next of examples of processes performed by the detailed information acquisition section 47 using the results of processing performed by the candidate area extraction section 46.

(1) Target Tracking

Tracking is generally a technique of seeking the motion of a tracked target or the change in its shape by estimating a given feature quantity of the tracked target in a feature quantity space in a time-evolving manner. For example, a parameter adapted to define a curve representing the contour of a tracked target is used as a feature quantity. A motion vector is estimated in the parameter space based on the contour estimated at a certain time step. Then, the contour candidate at the next time step obtained from the estimated motion vector and the edge image generated from the actual image are compared, thus evaluating the contour candidate and determining the contour that is likely to be the most credible.

Here, if a contour candidate is accidentally given a high evaluation value because of the edge of an object other than the tracked target, this result will affect the determination of a contour candidate at the next time step, and by extension, the tracking results constantly from that time onward. This given rise to accumulation of small errors derived from different time steps, possibly leading to discrepancy between the tracking results and the actual motion or shape of the tracked target.

Figure 8:
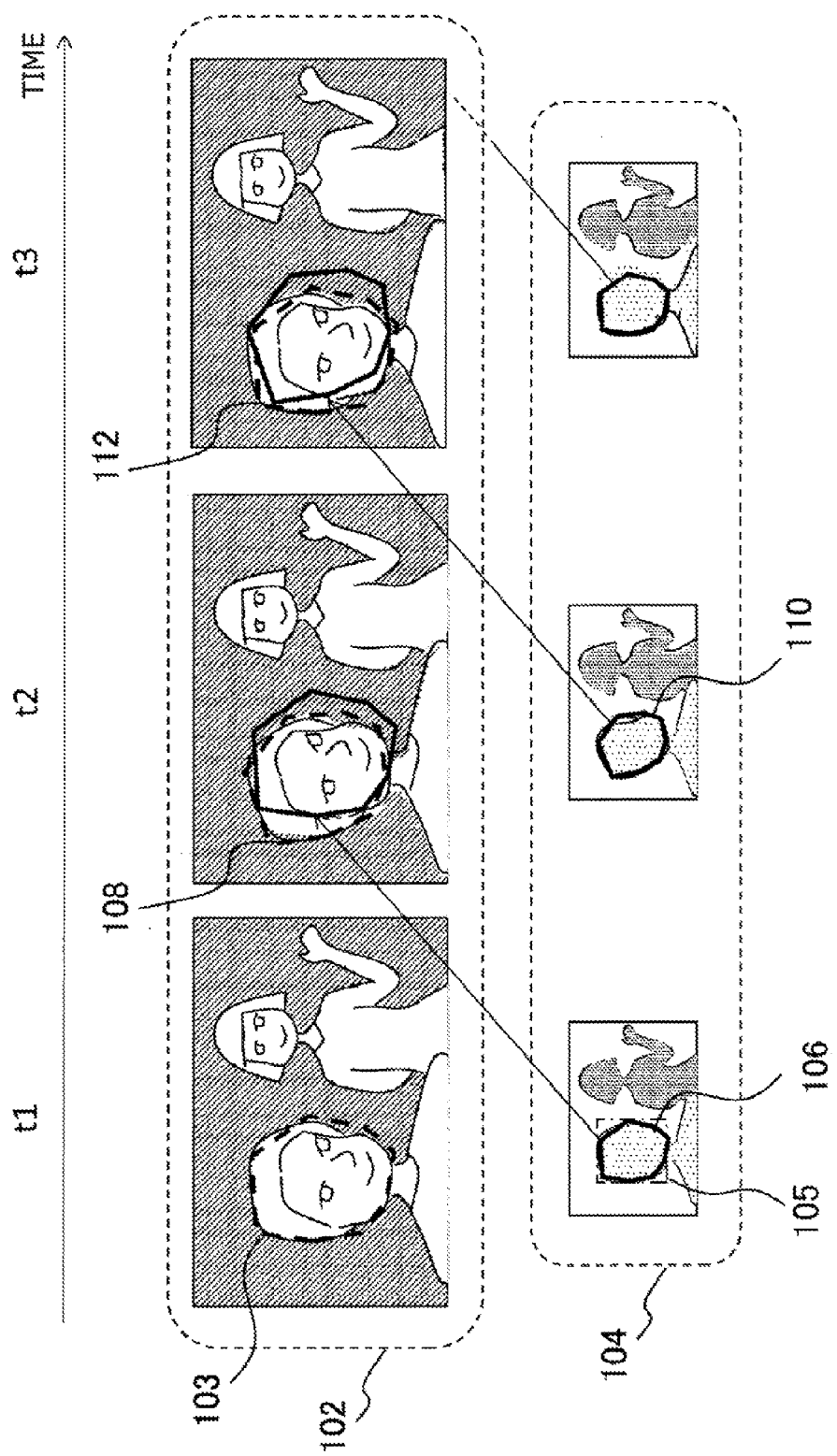
FIG. 8 is a diagram schematically illustrating the steps for performing tracking while updating the contour of a tracked target at each time step with processing results of the candidate area extraction section according to the present embodiment.

For this reason, the present embodiment prevents accumulation of errors using the processing results of the candidate area extraction section 46. FIG. 8 schematically illustrates the steps for performing tracking while updating the contour of a tracked target at each time step with the processing results of the candidate area extraction section 46. In FIG. 8, the horizontal axis represents the passage of time. An image 102 is a shot image to be processed at time steps t1, t2, t3, and so on. Further, although a head is tracked in this example, the main point is not to limit the tracked target to a head.

We assume here that a head contour 103 of the tracked person is estimated at time step t1. In the common technology described above, a head contour at next time step t2 is estimated based on the head contour 103. In the present embodiment, on the other hand, estimated head contour information is updated using a depth image 104 generated by the candidate area extraction section 46 and an extracted head picture area. More specifically, a head contour 108 of the tracked target at next time step t2 is estimated in the depth image 104 at time step t1 using a contour 106 of an area inside a rectangular region 105 of a given size that includes the head picture area. The area inside the contour 106 is made up of pixels whose values are the same as that of the pixel at the center of the picture or fall within a given range.

Similarly, a head contour 112 at next time step t3 is estimated using a contour 110 obtained from the depth image at time step t2 in place of the head contour 108 estimated at time step t2. Such a process is repeated at each time step. It should be noted that attention is focused on contour lines in this example assuming a case in which a parameter adapted to define a head contour is used as a feature quantity. However, various feature quantities are used depending on the tracking technology used. Therefore, information to be updated using the depth image 104 and extracted candidate area may be changed as appropriate. For example, the area surrounded by a contour may be used rather than a contour itself to estimate the change in feature quantity distribution inside that area, thus estimating a contour at the next time step.

An area made up of pixels whose values are the same as that of the pixel at the center of the picture or fall within a given range close thereto can be considered to represent the picture of the same subject. Therefore, the contour of that area can be considered to be the contour of the tracked target, and in this case, that of the head. Even if the head contour 103 or 108 estimated at the previous time step includes an error, the error can be reset every time step by estimating a contour at the next time step using the processing results of the candidate area extraction section 46 rather than the head contour 103 or 108. This prevents discrepancy from the actual tracked target due to accumulation of errors.

Figure 9:
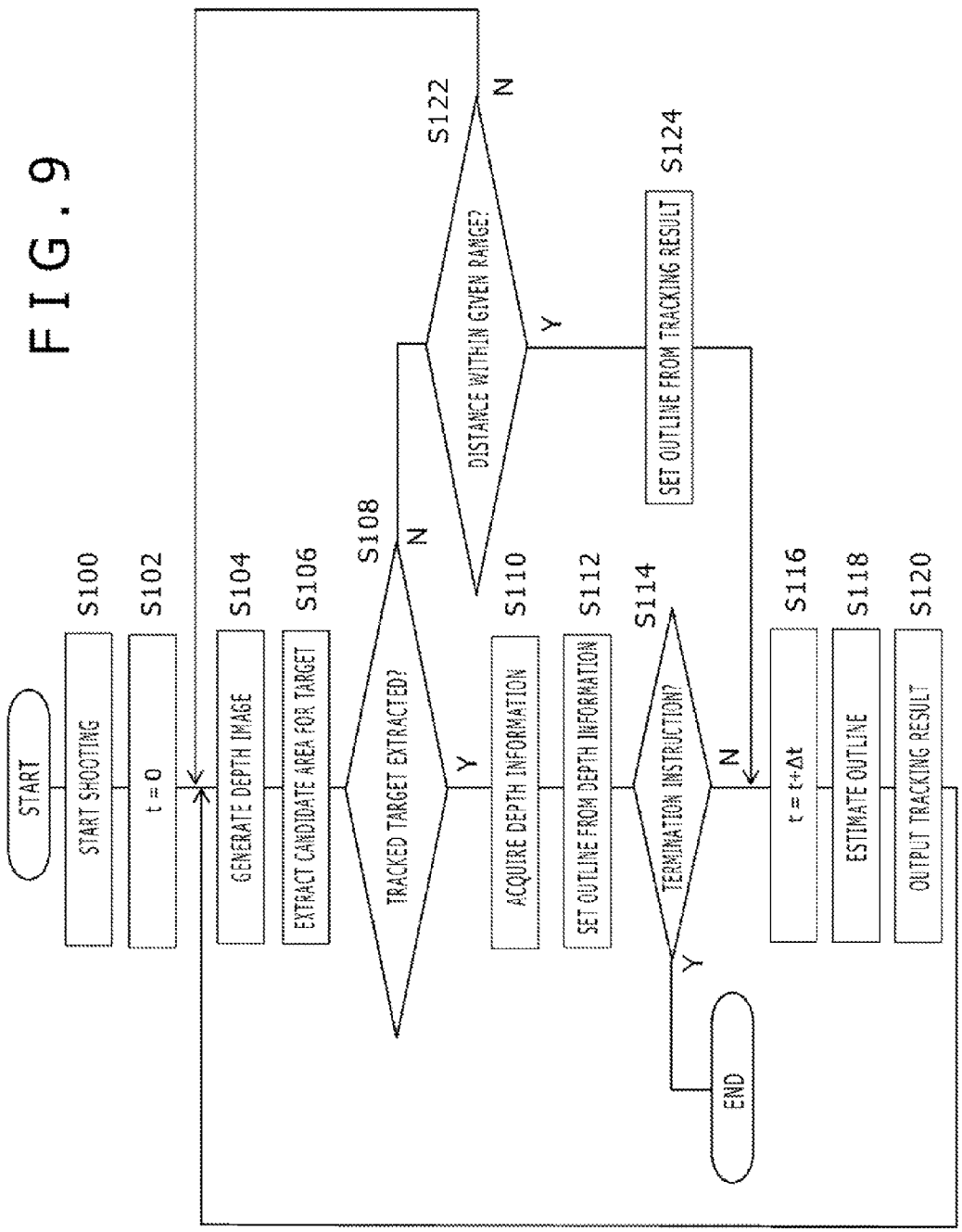
FIG. 9 is a flowchart illustrating the steps for the information processor according to the present embodiment to perform tracking.

A description will be given next of the operation of the information processor 10 during tracking. FIG. 9 is a flowchart illustrating the steps for the information processor 10 to perform tracking. First, when the user instructs the input information acquisition section 44 to initiate tracking, the imaging device 12 begins to shoot a subject in response to a shooting start request via the image acquisition section 42 (S100). The image acquisition section 42 sequentially acquires frame data of a movie shot as described above, storing the data in the image storage section 48. The processes from here onward are performed sequentially in parallel with the storage of shot image data at each time step.

The candidate area extraction section 46 reads the stereo image of the frame at first time step t=0 from the image storage section 48, generating a depth image using the stereo image (S104). Then, the candidate area extraction section 46 performs matching using a reference template image that represents the shape and size of a tracked target such as head, thus extracting an area in which a tracked target picture is likely to exist (S106). At this time, the candidate area extraction section 46 performs matching on depth images with a plurality of resolutions as described above, thus extracting a candidate area for each of different distance ranges. Alternatively, the candidate area extraction section 46 may perform matching on a single depth image without dividing the distance range.

The candidate area extraction section 46 supplies, to the detailed information acquisition section 47, the positions and sizes of the candidate areas extracted as described above as a candidate area list. If candidate areas are extracted from depth images with a plurality of resolutions, the candidate area extraction section 46 prepares a candidate area list for each resolution level and supplies the lists, each associated with one of the resolution levels. As a result, the detailed information acquisition section 47 verifies whether or not the tracked target picture is included in any of the candidate area lists (S108).

For example, if the heads of all persons are tracked, a face detection process is performed on the candidate areas for heads, thus verifying that these areas are heads. Alternatively, if the head of a particular person is tracked, a face recognition process is performed further on the detected face area, thus verifying that this area is the head of the person in question. These processes are performed using shot images with resolution levels associated with those of the depth images used for extraction of candidate areas.

When the tracked target picture has been extracted (Y in S108), the detailed information acquisition section 47 reads, from the image storage section 48, data of the area of a given size in the depth image used for extraction, storing the data in its internal memory (not shown) (S110). The data includes the picture area. Then, the detailed information acquisition section 47 identifies the area having the same pixel value as that of the pixel at the center of the picture or having the pixel values that fall within a given range therefrom, setting the contour of that area as a tracked target contour (S112).

If no instruction has been issued from the user to terminate the tracking at this stage (N in S114), the detailed information acquisition section 47 reads the shot image at next time step $t=t+\Delta t$ from the image storage section 48, estimating a contour at that time step based on the shot image (S116 and S118). That is, the contour candidate at the next time step obtained from the motion vector of the feature quantity estimated based on the contour set in S112 is compared, for example, against the actual edge of the image at the time step in question, thus determining the most credible contour. It should be noted that the shot image used here may be the one with the resolution level associated with that of the depth image from which the candidate contour has been extracted.

The output information generation section 50 generates an output image, for example, by representing the contour of the tracked target at time step $t=t+\Delta t$ estimated as described above and superimposing the contour on the shot image with the highest resolution, displaying the output image on the display device 16 as tracking results (S120). Alternatively, other information processing may be conducted using results of tracking such as gesture recognition. In parallel with this, the candidate area extraction section 46 generates depth images using the stereo image at time step $t=t+\Delta t$ and extracts a new candidate area for the tracked target by template matching (S104 and S106).

Then, the detailed information acquisition section 47 sets a tracked target contour using the extracted candidate area and the depth image, estimating a contour at the next time step (Y in S108 to S118). Then, the output information generation section 50 generates an image representing the estimated contour on the shot image, outputting the image as tracking results (S120). Basically, such a process is repeated at each time step until an instruction is input to terminate this process (Y in S114). This makes it possible to display a movie in which graphics representing a contour changes in such a manner as to follow the motion of the tracked target or the change in its shape. This also ensures that information processing progresses by using such a movie. Once tracking is initiated, the verification process in S108 may be performed based on the range of motion from the tracked target contour in the previous time step.

On the other hand, if the tracked target picture is not included in any of the candidate area lists supplied from the candidate area extraction section 46 (N in S108), the detailed information acquisition section 47 estimates a contour at the next time step based on the contour estimated by itself. In more detail, so long as the contour estimated by the detailed information acquisition section 47 is located within a given range from the picture position at the time of last extraction of the picture area of the tracked target by the candidate area extraction section 46 (Y in S122), the detailed information acquisition section 47 considers the estimation result as valid and estimates a contour at the next time step (S124, S116, and S118). In this case, the estimation process and the output of tracking results are performed in the same manner as described above.

On the other hand, if the contour estimated by the detailed information acquisition section 47 is located outside the given range from the picture position of the tracked target extracted last by the candidate area extraction section 46, the detailed information acquisition section 47 does not estimate a contour at the next time step (N in S122) and waits until the candidate area extraction section 46 extracts a next tracked target picture (S104 to Y in S108). If no picture area of the tracked target is extracted from the first frame, an initial value of the tracked target contour may be given by other technique. Further, updating of the picture contour extracted from the depth image as a tracked target contour may be performed at different time intervals from those of the tracking process adapted to estimate a contour.

Figure 10:
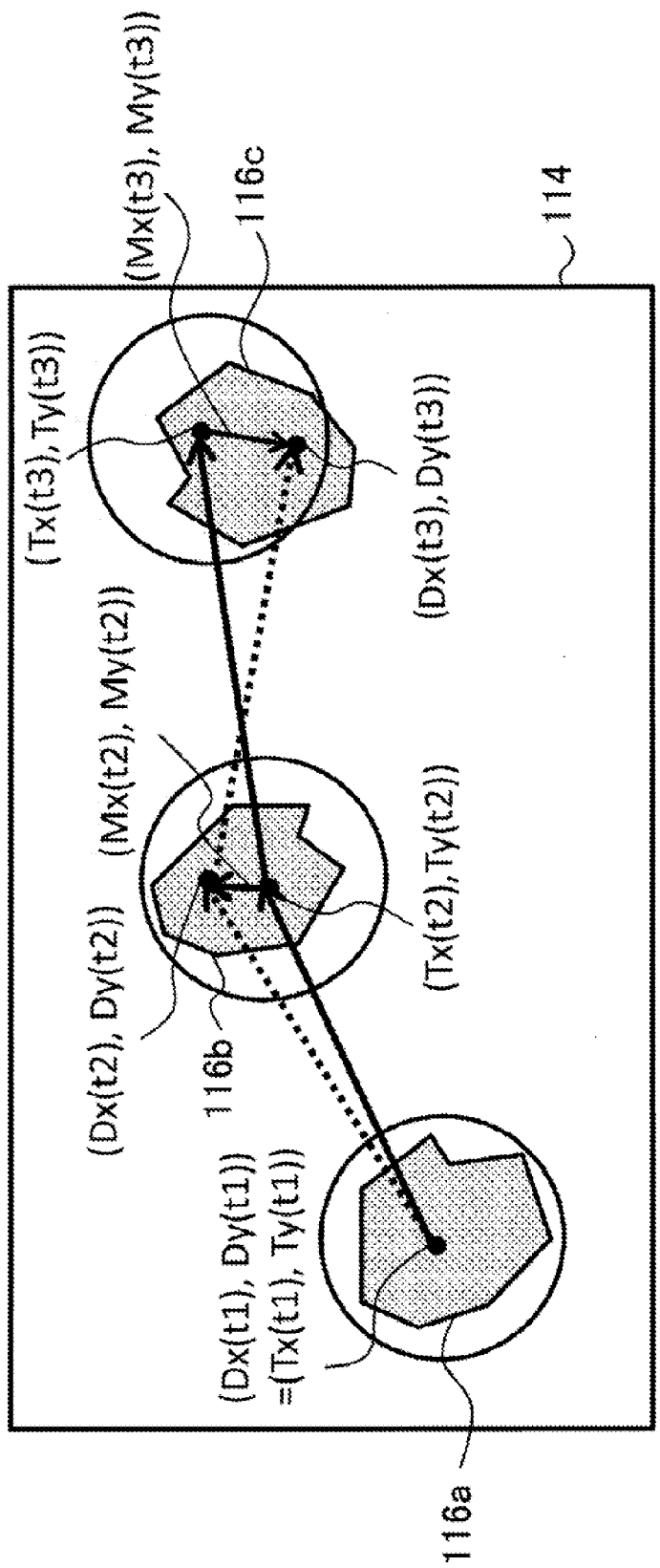
FIG. 10 is a diagram for describing a technique for correcting the contour of a tracked target estimated at each time step in the present embodiment.

In any case, if picture information obtained independently of time is introduced into tracking technology which is commonly designed to estimate a target contour in a time-evolving manner, it is possible to efficiently achieve highly accurate tracking that is unlikely to accumulate errors. In the above example, contour information was updated using processing results of the candidate area extraction section 46, and a contour at the next time step was estimated based on the updated information. However, a possible alternative would be to correct a contour estimated at a certain time step using processing results of the candidate area extraction section 46. FIG. 10 is a diagram for describing a technique for correcting the tracked target contour estimated at each time step.

We assume that the shaded areas of an image area 114 represent the tracked target pictures, and that the tracked target moves from a picture 116a, to a picture 116b, and to a picture 116c respectively at time steps t1, t2, and t3. Here, the contours of the pictures are comparable to the contours 106 and 110 of the depth image 104 shown in FIG. 8. At this time, coordinates of the centers of the pictures extracted at time steps t1, t2, and t3 by the candidate area extraction section 46 are (Dx(t1), Dy(t1)), (Dx(t2), Dy(t2)), and (Dx(t3), Dy(t3)), respectively.

On the other hand, we assume that the detailed information acquisition section 47 estimates circular contours through ordinary tracking process, and that coordinates of the centers of the contours are (Tx(t1), Ty(t1)), (Tx(t2), Ty(t2)), and (Tx(t3), Ty(t3)), respectively. Even if the position coordinates of the two are the same at time step t1 as shown in FIG. 10, there are vector differences of (Mx(t2), My(t2)), and (Mx(t3), My(t3)) at time steps t2 and t3, respectively.

At this time, a center position of the tracked target contour (Ox(t), Oy(t)) (t=t1, t2, t3, and so on), i.e., output results, is corrected as follows:

$$Ox(t) = Tx(t) + Mx(t) \times \Delta m$$
$$= Tx(t) + (Dx(t) - Tx(t)) \times \Delta m$$
$$Oy(t) = Ty(t) + My(t) \times \Delta m$$
$$= Ty(t) + (Dy(t) - Ty(t)) \times \Delta m$$

Here, $\Delta m$ is the factor that determines the weight of correction, and a value such as 0.1 is determined in advance. The factor may be varied optimally in accordance with the characteristic of the tracked target or that of the image. Such an arrangement also keeps to a minimum the discrepancy from the actual picture due to accumulation of errors if the contour of the tracked target is determined at each time step using the corrected coordinates and estimating a contour at the next time step based on the determined contour.

(2) Human Recognition

Figure 11:
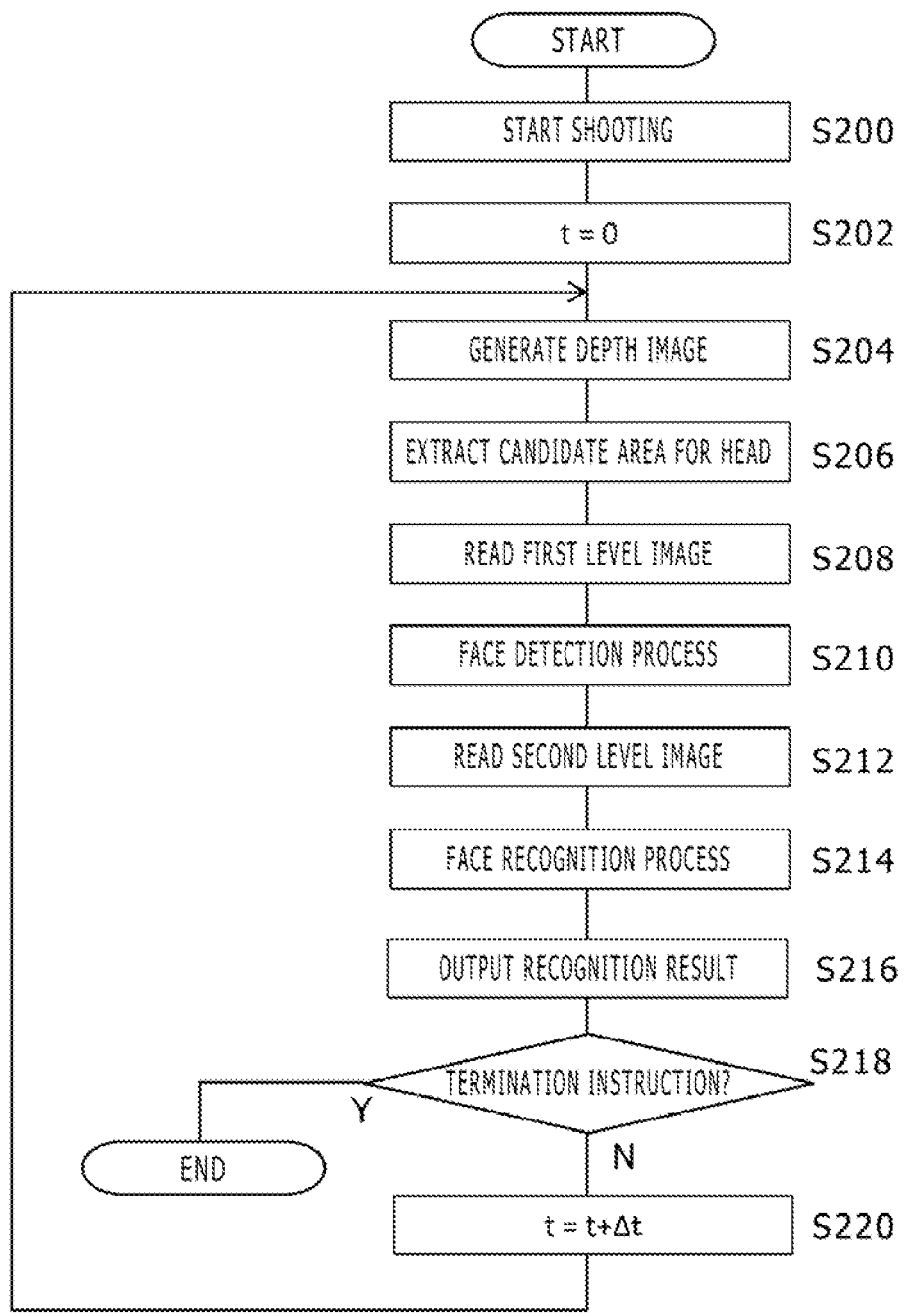
FIG. 11 is a flowchart illustrating the steps for the information processor according to the present embodiment to identify a human, a subject.

FIG. 11 is a flowchart illustrating the steps for the information processor 10 to identify a human, a subject. The processes from S200 to S206 are the same as those from S100 to S106 in FIG. 9. That is, the imaging device 12 begins to shoot a subject, for example, in response to a user instruction (S200). The candidate area extraction section 46 generates depth images using the stereo image at first time step t=0 (S202 and S204). Then, the candidate area extraction section 46 performs matching using a reference template image. However, a reference template image of a head is used here. Then, the candidate area extraction section 46 extracts a candidate area for head (S206).

The candidate area extraction section 46 supplies, to the detailed information acquisition section 47, the positions and sizes of the candidate areas extracted as described above as a candidate area list for head. If candidate areas are extracted from depth images with a plurality of resolutions, the candidate area extraction section 46 supplies the lists, each associated with one of the resolution levels. As a result, the detailed information acquisition section 47 reads, from the image storage section 48, image data of the area of a given size in the shot image with the associated resolution level (S208). The image data includes at least the extracted candidate area.

If picture areas of subjects located in different distance ranges have been extracted from depth images with a plurality of resolutions as described above, shot images are read, each with a resolution level associated with one of the resolutions of the depth images. That is, a high-resolution image is read for a far subject, and a low-resolution image is read for a close subject. This ensures uniform detection accuracy irrespective of the subject distance. In the flowchart shown in FIG. 11, the resolution level of images read in this step is collectively referred to as the "first level."

The detailed information acquisition section 47 performs a face detection process only on the area of a given size including the candidate area (S210). A common technique can be used for this process. Common techniques include extracting facial feature points and comparing a luminance distribution against a common facial luminance distribution. No matter which technique is used, the areas to be processed and the sizes thereof are limited. This contributes to significant reduction in processing load as compared to when the image as a whole is processed.

What is actually performed in S210 is to calculate an evaluation value representing the probability of a candidate area being a face for each of the candidate areas in the candidate area list and compare the evaluation value against a threshold so as to extract those areas that are likely to be faces with a probability equal to or greater than a given value. As a result, of the candidate areas for head extracted by the candidate area extraction section 46, those areas in which faces have been detected are narrowed down, thus identifying facial regions in these areas. One may step out of the processes of the flowchart in this step and perform other process using the identified facial regions. For example, the facial regions may be used to proceed with the verification in relation to the tracked target in S108 for tracking shown in FIG. 9.

Next, the detailed information acquisition section 47 reads, from the image storage section 48, image data of the area of a given size in the shot image with a resolution higher than that of the image read in S208 (S212). The image data includes at least the facial region area. Images with a plurality of resolution levels may be read in this process as done in S208. The resolution level of these images is collectively referred to as the "second level" in FIG. 11. Further, if there is no image with a resolution higher than that of the image read in S208, the image read in S208 may be diverted. Then, the detailed information acquisition section 47 performs a face recognition process only on the area of a given size including the facial region area (S214).

A common technique can be used for this process. One among common techniques is comparison against the configuration of feature points in the face of each person acquired in advance to search for the facial regions of persons having a high match rate. In this case, the areas to be processed and the sizes thereof are also limited, thus keeping processing load to a minimum even if a high-resolution image is used. The output information generation section 50 generates an output image, for example, by drawing the character associated with the person identified as described above in the appropriate area of the shot image, thus displaying the output image on the display device 16 as recognition results (S126). Alternatively, tracking or other information processing may be performed with a restricted number of persons.

When there is no instruction input to terminate the human recognition (N in S218), the processes from S204 to S216 are repeated using the image shot at each time step while incrementing the time step (S220). When an instruction is input, the human recognition is terminated (Y in S218). The above processes associate pictures with persons with excellent response, thus making it possible to distinguish between actions of a plurality of persons and reflect these actions into display images and information processing.

(3) Correction of Exposure of the Imaging Device

Figure 12:
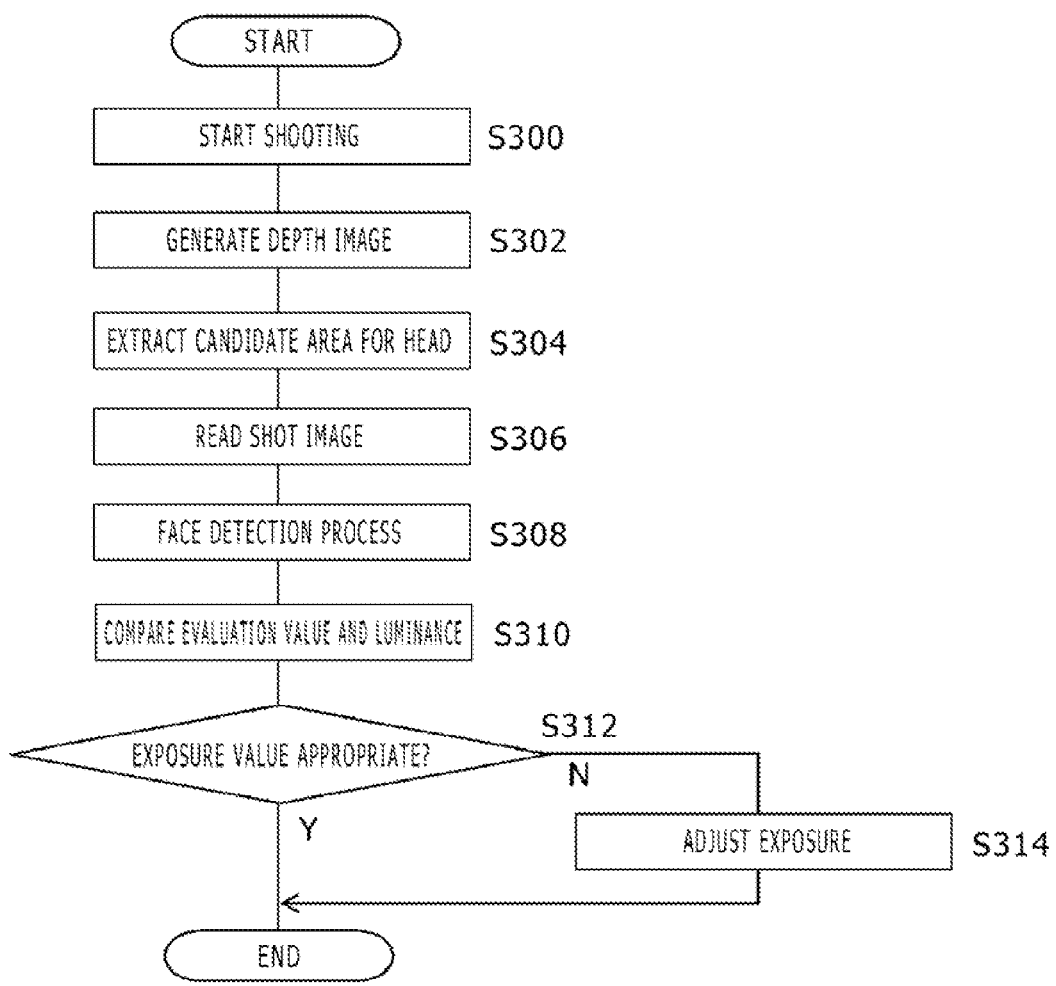
FIG. 12 is a flowchart illustrating the steps for the information processor according to the present embodiment to adjust the exposure of the imaging device.

The change in shooting environment changes the proper exposure of the imaging device 12. This may lead to essential areas being difficult to see if the shot image is displayed in an as-is manner or reduced processing accuracy during face recognition or tracking. For this reason, the exposure is adjusted using processing results of the candidate area extraction section 46, thus preventing malfunction. In this case, a mechanism is provided in the imaging device 12 to adjust the exposure in response to a request from the information processor 10. FIG. 12 is a flowchart illustrating the steps for the information processor 10 to adjust the exposure of the imaging device 12.

Although this flowchart shows a case in which the exposure is set to a human face, the target to which to set the exposure is not limited thereto. The processes in S300, S302, S304, S306, and S308 are the same as those in S200, S204, S206, S208, and S210, respectively. That is, the imaging device 12 begins to shoot a subject, for example, in response to a user instruction (S300). The candidate area extraction section 46 generates depth images using a stereo image (S302). It should be noted that this stereo image may be that of an arbitrary frame at a time when the exposure needs correction such as the first frame after the start of shooting.

Then, the candidate area extraction section 46 performs matching on the depth image using a reference template image of a head, thus extracting a candidate area for head (S304). The candidate area extraction section 46 supplies, to the detailed information acquisition section 47, the positions and sizes of the candidate areas extracted as described above as a candidate area list for head. If candidate areas are extracted from depth images with a plurality of resolutions, the candidate area extraction section 46 supplies the lists, each associated with one of the resolution levels. As a result, the detailed information acquisition section 47 reads, from the image storage section 48, image data of the area of a given size in the shot image with the associated resolution level (S306). The image data includes at least the extracted candidate area. Similarly, in this case, if subject picture areas in different distance ranges are extracted from depth images with a plurality of resolutions, shot images, each with a resolution level associated with one of the resolutions, are read.

The detailed information acquisition section 47 performs a face detection process only on the area of a given size including the candidate area, calculating an evaluation value representing the probability of a candidate area being a face for each of the candidate areas (S308). Then, the detailed information acquisition section 47 compares the evaluation value for each candidate area against the luminance in that candidate area, thus determining whether proper luminance is available, that is, whether or not the exposure is appropriate (S310 and S312). For example, the detailed information acquisition section 47 determines the candidate area with the highest evaluation value of all the candidate areas, i.e., the area most likely to be a face, and determines that the exposure is appropriate when the mean luminance value of that area falls within a given proper luminance range and determines that the exposure is inappropriate if the mean luminance value falls outside the proper luminance range.

If the exposure value is not appropriate (N in S312), the exposure value of the imaging device 12 is adjusted so that if the mean luminance value is smaller than the proper luminance range, the exposure is increased, and if the mean luminance value is larger than the proper luminance range, the exposure is reduced (S314). When the exposure value is appropriate, the exposure correction process is terminated in an as-is manner (Y in S312). That is, if there is even just a small area that can be identified as a face, the exposure is set to that area. However, it is probable that the area may be difficult to distinguish as a face or any other similar object because of the excessively dark or bright facial region. In preparation for this, if the face detection evaluation values for all the candidate areas are equal to or smaller than a given threshold, it is determined that the exposure value is inappropriate in S312.

In this case, one or a plurality of candidate areas are extracted, and the adjustment direction is determined based on whether the mean luminance value of the candidate area or areas is larger or smaller than the proper luminance range. The luminance value of a shot image stored in the image storage section 48 may be adjusted rather than adjusting the exposure value of the imaging device 12 in S314. Alternatively, both of these processes may be performed. Still alternatively, because the face detection evaluation value is likely to improve as a result of adjustment of the exposure value or luminance value, the face detection process and the adjustment of the exposure value or luminance value may be repeated until the exposure value or luminance value is appropriate.

In any case, the extraction of candidate areas for head in S304 is based on depth images. Therefore, it can be said that this process is robust to shooting environment because it is easy to maintain extraction accuracy even when appropriate detailed information such as facial structure is not available. Hence, it is possible to reliably obtain detailed information on essential areas by focusing attention only on restricted areas and setting the exposure to these areas. As a result, the processes at subsequent stages can be performed with high accuracy if the extraction process is followed by the human recognition process illustrated in FIG. 11 or the tracking process illustrated in FIG. 9.

The present embodiment described above generates depth images using a stereo image shot with an imaging device. Each of the depth images represents, on the image plane, the distance of a subject in the depth direction. Then, a reference template image of a target is adjusted in size based on the subject position in the depth direction represented by each depth image, followed by template matching, thus extracting an area in which a target picture is likely to exist.

At this time, depth images with a plurality of resolution levels are prepared, and a subject picture area is extracted for each distance range of the subject. This makes it possible to extract picture areas with uniform accuracy irrespective of the subject position and extract picture areas without waste. Then, tracking, face detection, face recognition, and exposure correction are performed using the extracted areas. Each of these processes deals with only restricted areas that are based on results of template matching on depth images, an independent process, thus ensuring high efficiency and providing improved accuracy thanks to multilateral analysis.

In tracking, for example, a tracked target at the next time step is estimated using area extraction results by template matching of a depth image rather than using tracking results at the previous time step, thus keeping accumulation of errors to a minimum and preventing discrepancy between actual tracked target and tracking results. Even if high-resolution images are used for tracking, face detection, face recognition, and exposure correction, the areas to be processed are limited. This ensures high accuracy in these processes without incurring increase in processing load.

The present invention has been described above based on an embodiment. It should be understood by those skilled in the art that the above embodiment is illustrative, that the combination of components and processes can be modified in various ways, and that such modification examples also fall within the scope of the present invention.

REFERENCE SIGNS LIST

2 Information processing system, 10 Information processor, 12 Imaging device, 16 Display device, 13a First camera, 13b Second camera, 22 CPU, 24 GPU, 26 Main memory, 42 Image acquisition section, 44 Input information acquisition section, 46 Candidate area extraction section, 47 Detailed information acquisition section, 48 Image storage section, 50 Output information generation section.

INDUSTRIAL APPLICABILITY

As described above, the present invention is applicable to computers, game consoles, information terminals, image processors, image display devices, and other information processors.

The invention claimed is:

1. An information processor comprising:
an image device arranged to capture a shot image and to transform the shot image into a plurality of depth images having different resolutions;
a candidate area extraction section arranged to extract candidate areas in which a target picture is likely to exist in the shot image by performing template matching on each of the plurality of depth images using a template image, the depth images representing, on an image plane, a distance of a subject from a camera in a depth direction as a pixel value, the template image representing a shape and a size of the target to be analyzed,
wherein, for each of the plurality of depth images, the template image is varied in size during template matching only within a predefined magnification range;
a detailed information acquisition section arranged to analyze the candidate areas extracted by the candidate area extraction section; and
an output information generation section arranged to generate output information based on results of image analysis performed by the detailed information acquisition section and output the output information.

2. The information processor of claim 1, wherein the detailed information acquisition section determines, as a target picture area and in each frame of a movie, i.e., the shot image, an area of the associated depth image, the area inside the candidate area extracted by the candidate area extraction section, the area being made up of pixels whose values fall within a given range, so as to estimate the target picture area at the next frame for tracking.

3. The information processor of claim 1, wherein the detailed information acquisition section performs tracking of the target in the movie, i.e., the shot image, and corrects tracking results obtained for each frame of the movie based on the candidate area for the target extracted by the candidate area extraction section from the associated depth image.

4. The information processor of claim 1, wherein the candidate area extraction section extracts, from each of the plurality of depth images, the candidate area for the picture existing in a distance range in the depth direction associated with one of the resolutions, and the detailed information acquisition section performs image analysis on the shot image with the resolution associated with that of the depth image from which the candidate area has been extracted.

5. The information processor of claim 1, wherein the image analysis is facial recognition analysis, and the resolution of the depth image from which the candidate area is extracted by the candidate area extraction section is smaller than that of the shot image on which image analysis is performed by the detailed information acquisition section using information relating to the candidate area.

6. The information processor of claim 1, wherein the detailed information acquisition section requests the camera to adjust an exposure value in such a manner that if a luminance of the candidate area extracted by the candidate area extraction section in the shot image falls outside a proper range, the luminance falls within the proper range.

7. The information processor of claim 1, wherein the candidate area extraction section extracts the candidate area for human head, i.e., the target, and the detailed information acquisition section detects a facial area by performing a face detection process on the extracted candidate area in the shot image and identifies the person of the picture by performing a face recognition process on the detected facial area using a shot image with a higher resolution than that of the shot image used for the face detection process.

8. An information processing method used by an information processor to process information using a shot image from a camera, the information processing method comprising:
transforming the shot image into a plurality of depth images having differing resolutions,
extracting candidate areas in which a target picture is likely to exist in the shot image by performing template matching on each of the plurality of depth images using a template image, the depth images representing, on an image plane, a distance of a subject from the camera in a depth direction as a pixel value, the template image being read from a memory and representing a shape and a size of the target to be analyzed;
wherein, for each of the plurality of depth images, the template image is varied in size during template matching only within a predefined magnification range;
analyzing the extracted candidate areas; and
generating an output image reflecting the image analysis results and outputting the output image to a display device.

9. A computer program for a computer stored on a non-transitory computer readable medium for causing a computer to execute:
transforming a shot image into a plurality of depth images having differing resolutions;
extracting a candidate area in which a target picture is likely to exist in the shot image by performing template matching on each of the plurality of depth images using a template image, the depth images representing, on an image plane, a distance of a subject from a camera in a depth direction as a pixel value, the template image being read from a memory and representing a shape and a size of the target to be analyzed;
wherein, for each of the plurality of depth images, the template image is varied in size during template matching only within a predefined magnification range;
analyzing extracted candidate areas; and
generating an output image reflecting the image analysis results and outputting the output image to a display device.

* * * * *